United States Patent
Rellis

(10) Patent No.: US 9,060,647 B2
(45) Date of Patent: Jun. 23, 2015

(54) FROTHING DEVICE FOR AN ESPRESSO MACHINE

(71) Applicant: Whirlpool Corporation, Benton Harbor, MI (US)

(72) Inventor: Daniel Rellis, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 299 days.

(21) Appl. No.: 13/667,193

(22) Filed: Nov. 2, 2012

(65) Prior Publication Data

US 2014/0123858 A1     May 8, 2014

(51) Int. Cl.
*A47J 31/46* (2006.01)
*A47J 31/44* (2006.01)

(52) U.S. Cl.
CPC .............. *A47J 31/46* (2013.01); *A47J 31/4485* (2013.01); *A47J 31/4403* (2013.01); *A47J 31/4489* (2013.01)

(58) Field of Classification Search
CPC .... A47J 31/4489; A47J 31/4485; A47J 31/46
USPC ................................................. 99/293, 323.1
See application file for complete search history.

(56) References Cited

U.S. PATENT DOCUMENTS

| 4,287,817 | A * | 9/1981 | Moskowitz et al. ............ 99/282 |
| 6,161,469 | A | 12/2000 | Rolla |
| 6,796,705 | B1 | 9/2004 | Khubani |
| 6,823,771 | B2 | 11/2004 | Piazza |
| 6,901,848 | B2 | 6/2005 | Beretta |
| 2006/0174771 | A1 | 8/2006 | Frigeri |
| 2007/0187421 | A1 | 8/2007 | Constantine |
| 2008/0302252 | A1 | 12/2008 | O'Brien |
| 2010/0307346 | A1 | 12/2010 | Menashes |
| 2011/0146500 | A1 | 6/2011 | Boussemart |
| 2011/0162534 | A1 | 7/2011 | Boussemart |

OTHER PUBLICATIONS

WO 2007/017342 (Rosa et al.) Feb. 2007.*
WO 2011/104345 (Herzog et al.) Sep. 2011.*

* cited by examiner

*Primary Examiner* — Reginald L Alexander

(57) ABSTRACT

An apparatus for making beverages including a frothing device fluidly coupled to an outlet of a wand fluidly coupled to a boiler. The frothing device includes a nozzle configured to be positioned below the surface of the liquid, and a valve member movable between a first position in which steam is prevented from moving between the outlet of the wand and the nozzle and a second position in which steam is permitted to move between the outlet of the wand and the nozzle. The frothing device also includes a float device that maintains the frothing device on the surface of liquid.

13 Claims, 5 Drawing Sheets

FROTHING DEVICE FOR AN ESPRESSO MACHINE

TECHNICAL FIELD

The present disclosure relates generally to beverage preparation appliances and more particularly to an espresso machine and accessories for an espresso machine.

BACKGROUND

An espresso machine is a domestic appliance used to make espresso, steam liquid, or heat water for consumption. Many espresso machines include a pump, a boiler, and electronics to control the operation of the pump and the boiler. Many espresso machines also include a steam wand, which may be used to steam and froth liquids.

SUMMARY

According to one aspect of the disclosure, an apparatus for making beverages is disclosed. The apparatus includes a vessel sized to contain liquid, a boiler operable to produce steam, a wand fluidly coupled to the boiler, a housing configured to float on liquid contained in the vessel, and a control valve secured to the housing and fluidly coupled to an outlet of the wand. The control valve includes a nozzle configured to be positioned below the surface of the liquid, and a valve member movable between a first position in which steam is prevented from moving between the outlet of the wand and the nozzle and a second position in which steam is permitted to move between the outlet of the wand and the nozzle.

In some embodiments, the nozzle may be configured to be positioned at a predetermined depth below the surface of the liquid. Additionally, in some embodiments, the valve member may be pressure-operated.

In some embodiments, the control valve may further include a biasing element configured to bias the valve member in the first position. In some embodiments, the apparatus may include a telescopic pipe having a first end coupled to the wand and a second end coupled to the control valve. The telescopic pipe may have a passageway defined therein connecting the outlet of the wand to the control valve.

In some embodiments, the housing may encapsulate a source of buoyancy.

In some embodiments, the apparatus may include a base, a filter chamber positioned above the base that includes an outlet, and a valve including a valve member movable between a first position in which steam is permitted to advance from the boiler to the wand and a second position in which fluid is permitted to advance from the boiler to the filter chamber.

According to another aspect, an espresso machine includes a vessel sized to contain liquid, a steam generator, and a frothing device. The frothing device includes a control valve positioned in the vessel, a pipe having a first end fluidly coupled to the control valve and a second end fluidly coupled to the steam generator such that steam produced by the steam generator may be advanced to the control valve, a housing configured to float on the surface of the liquid contained in the vessel, and a nozzle configured to be positioned below the surface of the liquid. The control valve includes a valve member movable between a first position in which steam is permitted to advance through the nozzle into the liquid below the surface thereof and a second position in which steam is prevented from advancing through the nozzle.

In some embodiments, the frothing device may include a telescopic pipe. In some embodiments, the nozzle may have an outlet positioned a predetermined distance below the housing.

In some embodiments, the vessel may be a pitcher. In some embodiments, the espresso machine may include a base, a filter chamber positioned above the base that includes an outlet, and a valve including a valve member movable between a first position in which steam is permitted to advance from the steam generator to the nozzle and a second position in which fluid is permitted to advance from the steam generator to the filter chamber.

In some embodiments, the control valve may further include a biasing element configured to bias the valve member in the second position.

According to another aspect, an apparatus for making beverages includes a vessel sized to contain liquid, a boiler operable to produce steam, a wand fluidly coupled to the boiler, and a frothing device fluidly coupled to an outlet of the wand. The frothing device includes a nozzle configured to be positioned below the surface of the liquid, and a valve member movable between a first position in which steam is prevented from moving between the outlet of the wand and the nozzle and a second position in which steam is permitted to move between the outlet of the wand and the nozzle.

In some embodiments, the frothing device may include a housing configured to float on liquid contained in the vessel.

In some embodiments, the nozzle may be configured to be positioned at a predetermined depth below the surface of the liquid.

In some embodiments, the frothing device may include a telescopic pipe coupled to the wand.

BRIEF DESCRIPTION OF THE DRAWINGS

The detailed description particularly refers to the following figures, in which.

DETAILED DESCRIPTION OF THE DRAWINGS

Figure 1:
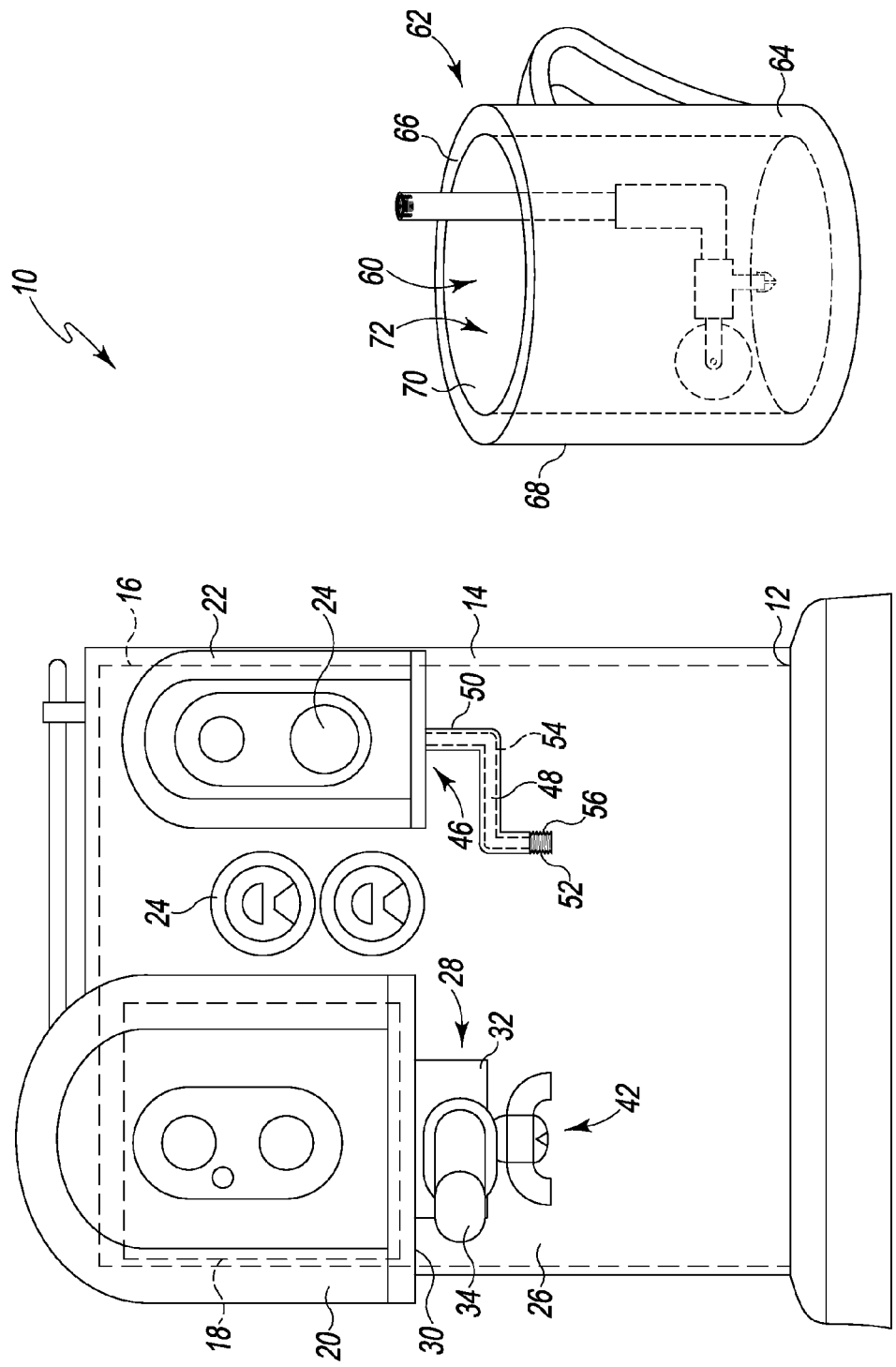
FIG. 1 is a perspective view of an espresso machine, a frothing device, and a pitcher.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a beverage preparation apparatus is shown as an espresso machine 10. The espresso machine 10 includes a base 12 and a housing 14 extending upwardly from the base 12. The housing 14 defines an interior space 16 within which a number of internal components (such as boiler 208) are located. The base 12 supports the housing 14 on a surface, such as, for example, a countertop, bench, or table surface on which the espresso machine 10 may be positioned during use.

A number of controls 24, such as, for example, buttons, switches, dials, or other types of controls, are located on a front surface 26 of the housing 14. As described in greater detail below, a user may utilize the controls 24 to operate the espresso machine 10. For example, one of the controls may be operable to activate the boiler to heat liquid.

The housing 14 includes a brewing head 20 and a steam head 22 that are integrally formed with the housing 14. The brewing head 20 and the steam head 22 extend outwardly away from the front surface 26. As shown in FIG. 1, the heads 20, 22 are positioned above and spaced apart from the base 12. A cup, mug, or other fluid container may be positioned on the base 12 below one of the heads 20, 22.

In the illustrative embodiment, the espresso machine 10 also includes a portafilter 28 that is removably coupled to the brewing head 20. The portafilter 28 includes a filter basket receiver 32 that is secured to the lower end 30 of the brewing head 20 and a handle 34 that extends from the filter basket receiver 32. The basket receiver 32 has a chamber sized to receive a filter basket 40, which contains the coffee grounds or coffee pods used to make the coffee. The portafilter 28 also has a dispensing outlet 42 positioned below the basket receiver 32. The outlet 42 faces the base 12 and hence any cup or other liquid container positioned on the base 12.

As described above, the espresso machine 10 also includes a steam head 22 that is positioned above the base 12. The steam head 22 has a lower outlet 46 that faces the base 12. A steam or frothing wand arm 48 is coupled to the lower outlet 46. The wand arm 48 extends from an upper end 50 that is pivotally coupled to the lower outlet 46. The wand arm 48 has a free lower end 52 that has a plurality of external threads 56 formed thereon. A passageway 54 is defined through the wand arm 48. Steam or hot water may be advanced from the lower outlet 46 through the passageway 54 and out the lower end 52 of the wand arm 48.

As shown in FIG. 1, the espresso machine 10 also includes a frothing device 60 that may be coupled to the lower end 52 of the wand arm 48. As described in greater detail below, the frothing device 60 is configured to float on the surface of the milk such that steam or hot water may be introduced at a particular point or depth below the surface of the milk during each use.

The espresso machine 10 also includes a pitcher 62 that is sized to receive the frothing device 60 and may be positioned below the steam head 22 on the base 12. In the illustrative embodiment, the pitcher 62 has a cylindrical body 64 and a circular opening 66 defined in the upper end 68 thereof. An inner wall 70 extends downwardly from the opening 66 to define a fluid chamber 72. The fluid chamber 72 is sized to receive milk, water, or other liquids to be frothed by the espresso machine 10. In use, the frothing device 60 may be positioned in the fluid chamber 72, as described in greater detail below.

Figure 2:
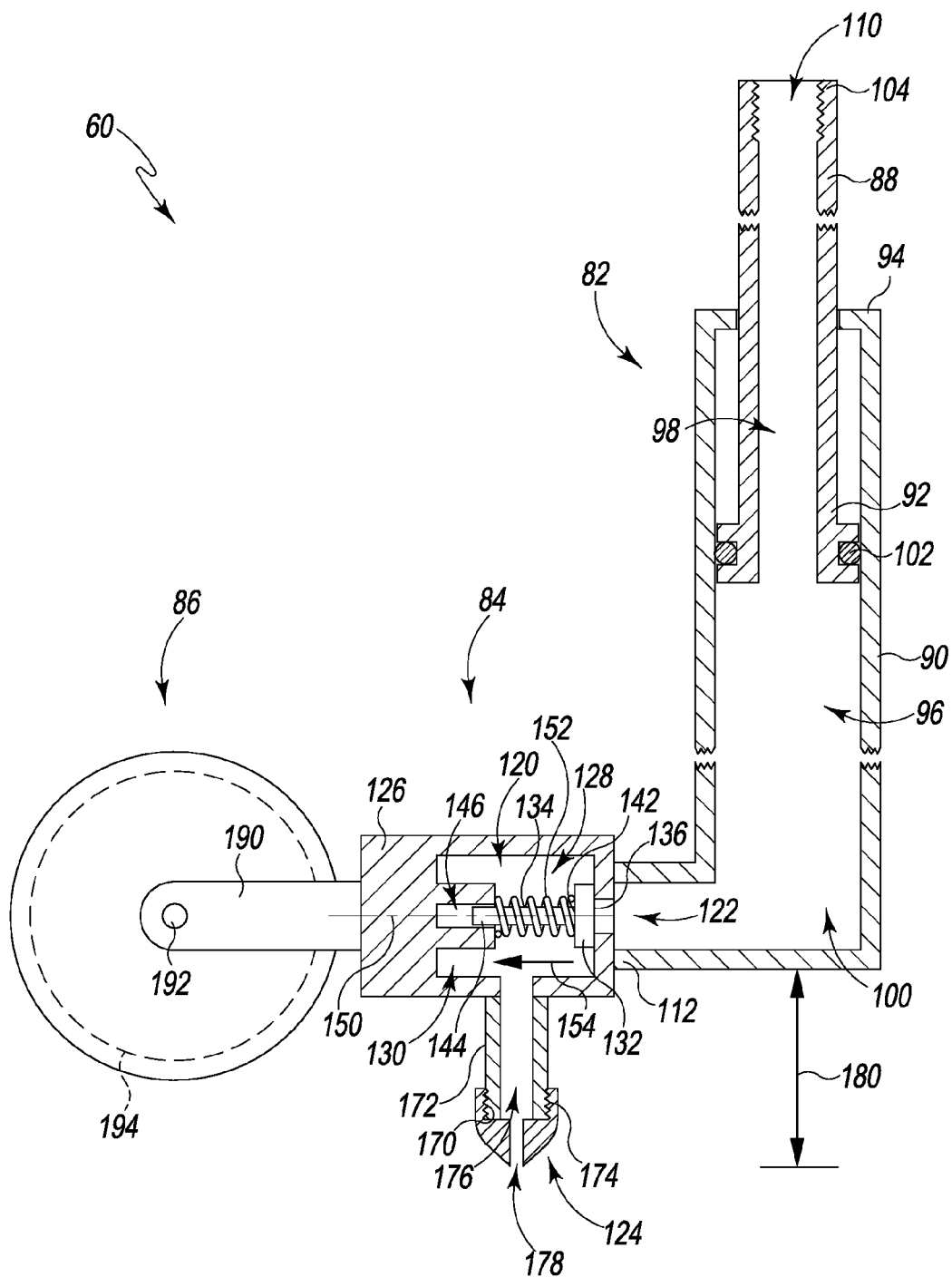
FIG. 2 is a cross-sectional side elevation view of the frothing device of FIG. 1.

Referring now to FIG. 2, the frothing device 60 has a telescopic pipe 82 configured to be secured to the wand arm 48, a main body 84 secured to the telescopic pipe 82, and a float device 86 secured to the main body 84. The telescopic pipe 82 includes a pair of pipe sections 88, 90, which are movable relative to one another. Specifically, an end 92 of the pipe section 88 is received into, and telescopes with, an end 94 of the pipe section 90. Each of the pipe sections 88, 90 is formed from a metallic material such as, for example, stainless steel, but it should be appreciated that in other embodiments the pipe sections 88, 90 may be plastic. The telescopic pipe 82 has a hollow interior 96 defined by the hollow passageways 98, 100 of the pipe sections 88, 90, respectively. As will be described in greater detail below, steam or hot water may advance through the hollow interior 96 of the pipe 82 to the main body 84. A seal 102 attached to the end 92 of the pipe section 88 engages the pipe section 90 to prevent steam from exiting through the end 94 of pipe section 90.

The lower end 52 of the wand arm 48 is secured to an upper end 104 of the pipe section 88. As shown in FIGS. 1 and 2, an internally-threaded aperture 110 is defined in the upper end 104 of the pipe section 88. The aperture 110 is sized to receive threaded end 52 of the wand arm 48. It should be appreciated that in other embodiments the wand arm 48 and the frothing device 60 may include quick connectors or other adaptors to secure the frothing device 60 to the wand arm 48. For example, the frothing device 60 may include an internally-threaded collar that is rotatable relative to the telescopic pipe 82 to secure the frothing device 60 to the wand arm 48. It should also be appreciated that in other embodiments the telescopic pipe 82 may be replaced with a flexible or semi-flexible tube or hose.

The pipe section 90 of the telescopic pipe 82 has a lower end 112 secured to the main body 84. In the illustrative embodiment, the pipe 82 and the main body 84 are permanently fixed to one another. It should be appreciated that in other embodiments the main body 84 may be configured to be detached from the pipe 82. As shown in FIG. 2, the main body 84 includes a control valve 120 positioned over an outlet 122 of the telescopic pipe 82 and a nozzle 124 positioned below the control valve 120.

The control valve 120 has a housing 126 and a valve member 128 that is positioned in an inner chamber 130 defined in the housing 126. The valve member 128 includes a plug 132 and a stem 134 extending away from the plug 132. The plug 132 has a front face 136 that is sized to be positioned over the outlet 122 of the pipe 82 such that fluid is prevented from advancing through the outlet 122 and into the inner chamber 130. In the illustrative embodiment, the face 136 is substantially flat, but it should be appreciated that in other embodiments the face 136 may be cone-shaped or hemi-spherically-shaped. The stem 134 of the valve member 128 extends from an end 142 secured to the plug 132 to a tip 144. As shown in FIG. 2, the housing 126 has an aperture 146 defined therein that receives the tip 144 of the stem 134.

The aperture 146 of the housing 126 defines an axis 150, and the valve member 128 is operable to move along the axis 150 relative to the outlet 122 of the pipe 82. In the illustrative embodiment, the valve member 128 is movable between a blocking position in which the plug 132 is positioned over the outlet 122 of the pipe 82 and an open position in which the plug 132 is spaced apart from the outlet 122 such that fluid is permitted to advance through the outlet 122 and into the chamber 130. As shown in FIG. 2, the control valve 120 includes a biasing element, such as, for example, a spring 152 that biases the valve member 128 in the blocking position. When steam or hot water is advanced into the pipe 82 at a predetermined pressure, the bias exerted by the spring 152 may be overcome and the valve member 128 may move along the axis 150 in the direction indicated by arrow 154 such that the steam or hot water may advance into the chamber 130.

As described above, the frothing device 60 also includes a nozzle 124 that is positioned below the control valve 120. In the illustrative embodiment, the nozzle 124 includes a threaded aperture 170. The main body 84 includes an arm 172 that extends downwardly from the control valve housing 126 to a threaded stud 174. The threaded aperture 170 of the nozzle 124 receives the threaded stud 174 of the arm 172 to removably secure the nozzle 124 to the main body 84. In that way, the nozzle 124 may be detached from the main body 84 for cleaning.

As shown in FIG. 2, the arm 172 has a passageway 176 that connects the outlet 178 of the nozzle 124 with the fluid chamber 130 of the control valve 120. Fluid such as steam or hot water that is in the chamber 130 of the control valve 120 may advance down the passageway 176 and through the outlet 178 into the milk or other liquid contained in the pitcher 62. In the illustrative embodiment, the outlet 178 of the nozzle 124 is positioned a predetermined distance 180 below the housing 126 of the control valve 120. The predetermined distance 180 corresponds to the desired depth 182 (see FIG. 4) of the nozzle 124 when the nozzle 124 is inserted into milk to be frothed. In the illustrative embodiment, the distance 180 is equal to 0.5 inches. It should be appreciated that in other embodiments the distance 180 may be between 0.01 inches and 0.5 inches. It should be appreciated that in other embodiments the frothing device 60 may include an adjustment mechanism operable to change the distance 180 and hence the depth of the nozzle 124 when inserted into liquid during use.

As described above, the frothing device 60 also includes a float device 86 configured to maintain the frothing device 60 on the surface of the milk, water, or other fluid contained in the pitcher 62. As shown in FIG. 2, the frothing device 60 includes a mounting bracket 190 that extends outwardly from the main body 84. A fastener, such as, for example, pin 192 extends through the mounting bracket 190 and engages the float device 86 to secure the float device 86 to the main body 84.

The float device 86 includes a source of buoyancy 194 that is sized to maintain the frothing device 60 on the surface of the fluid contained in the pitcher 62. In the illustrative embodiment, the source of buoyancy is a volume of air sized to balance the weight of the frothing device 60. It should be appreciated that in other embodiments the source of buoyancy may include a foam core. It should also be appreciated that in other embodiments the frothing device 60 may include additional float devices to balance the weight of the frothing device 60 and maintain the device 60 on the surface of the liquid.

Figure 3:
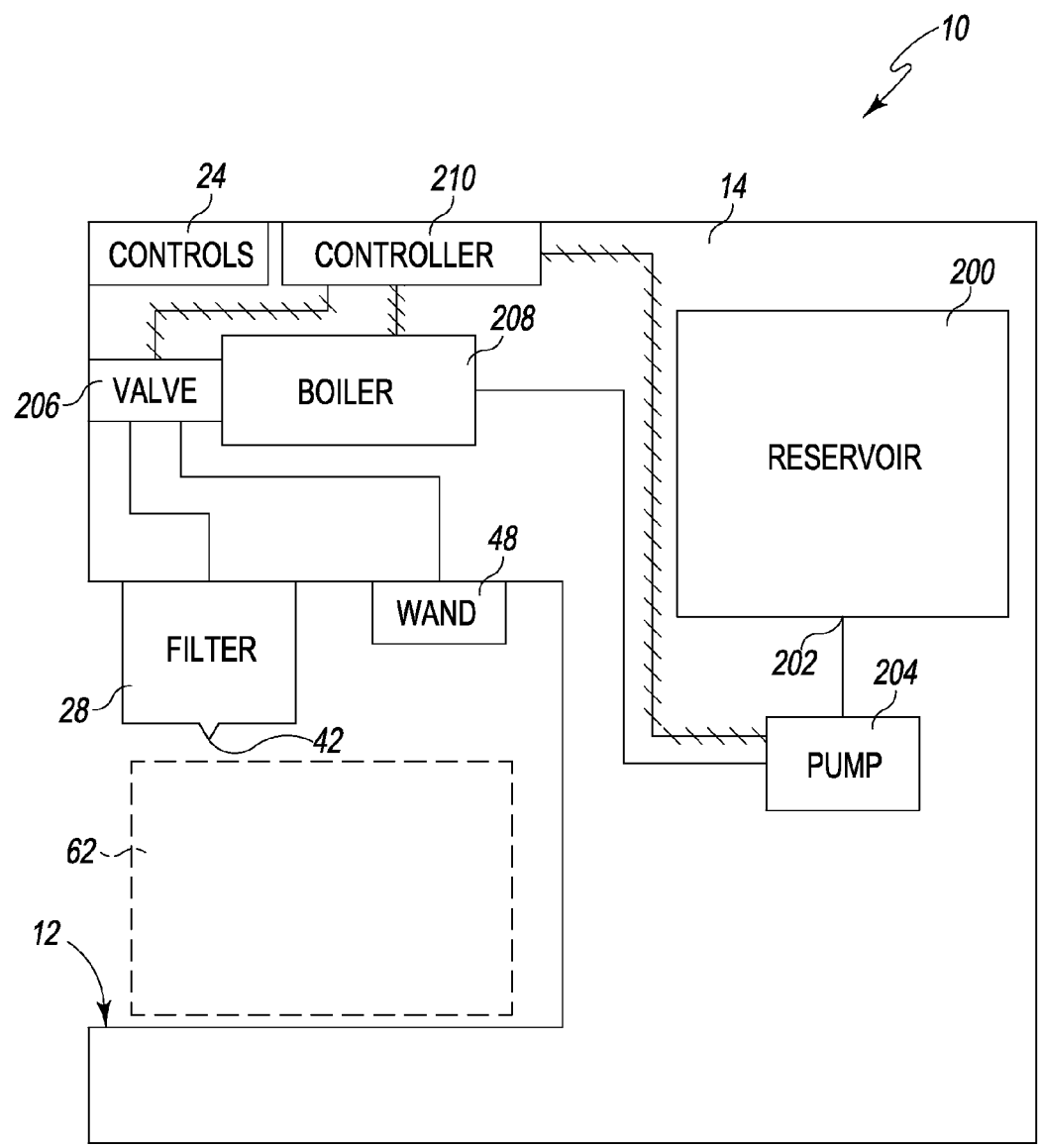
FIG. 3 is a simplified block diagram of the espresso machine of FIG. 1.

Referring now to FIG. 3, the espresso machine 10 is shown in a simplified block diagram. The espresso machine 10 includes a fluid tank or reservoir 200 secured to the housing 14. The reservoir 200 includes an outlet 202 connected to a pump 204 that is operable to advance fluid from the reservoir 200 to a control valve 206. The control valve 206 is operable to direct fluid to the brew head 20 and the filter basket 40 or to the steam head 22 and the wand arm 48.

A boiler 208 is positioned between the pump 204 and the control valve 206. A control signal may selectively activate the boiler 208 to heat fluid advancing from the reservoir 200 to the control valve 206. In operation, the pump 204 is selectively energized to supply fluid from the reservoir 200 to the boiler 208. The boiler 208 heats fluid passing therethrough and is operable to convert the fluid to steam before the steam is advanced to the control valve 206. It should be appreciated that in other embodiments the espresso machine may include a boiler dedicated for use with the brew head 20 and a separate boiler dedicated for use with the steam head 22.

The espresso machine 10 also includes an electronic control unit (ECU) or "electronic controller" 210. The electronic controller 210 includes, amongst other components customarily included in such devices, a processor such as a microprocessor and a memory device such as a programmable read-only memory device ("PROM") including erasable PROM's (EPROM's or EEPROM's). The electronic controller 210 is, in essence, the master computer responsible for interpreting electrical signals sent by sensors associated with the espresso machine 10 and for activating or energizing electronically-controlled components associated with the espresso machine 10. For example, the electronic controller 210 is configured to control operation of the various components of the espresso machine 10, including the pump 204, the valve 206, and the boiler 208. The electronic controller 210 also monitors various signals from the controls 24. The electronic controller 210 also determines when various operations of the espresso machine 10 should be performed. For example, the electronic controller 210 is operable to control the components of the espresso machine 10 such that the espresso machine 10 may switch between a brewing mode and a steaming mode.

In use, the frothing device 60 is secured to the wand arm 48. To do so, the upper end 104 of the telescopic pipe 82 of the frothing device 60 is aligned with the lower end 52 of the wand arm 48. The frothing device 60 may be advanced upward to engage the externally-threaded lower end 52 of the wand arm 48 with the internally-threaded aperture 110 of the telescopic pipe 82. The telescopic pipe 82 may then be threaded onto the wand arm 48.

The user may place the frothing device 60 in the fluid chamber 72 of the pitcher 62. Because the pipe section 90 of the frothing device 60 telescopes relative to the pipe section 88, the pipe section 90 may slide downward until the nozzle 124 of the frothing device 60 contacts the bottom surface 74 of the pitcher 62.

Figure 4:
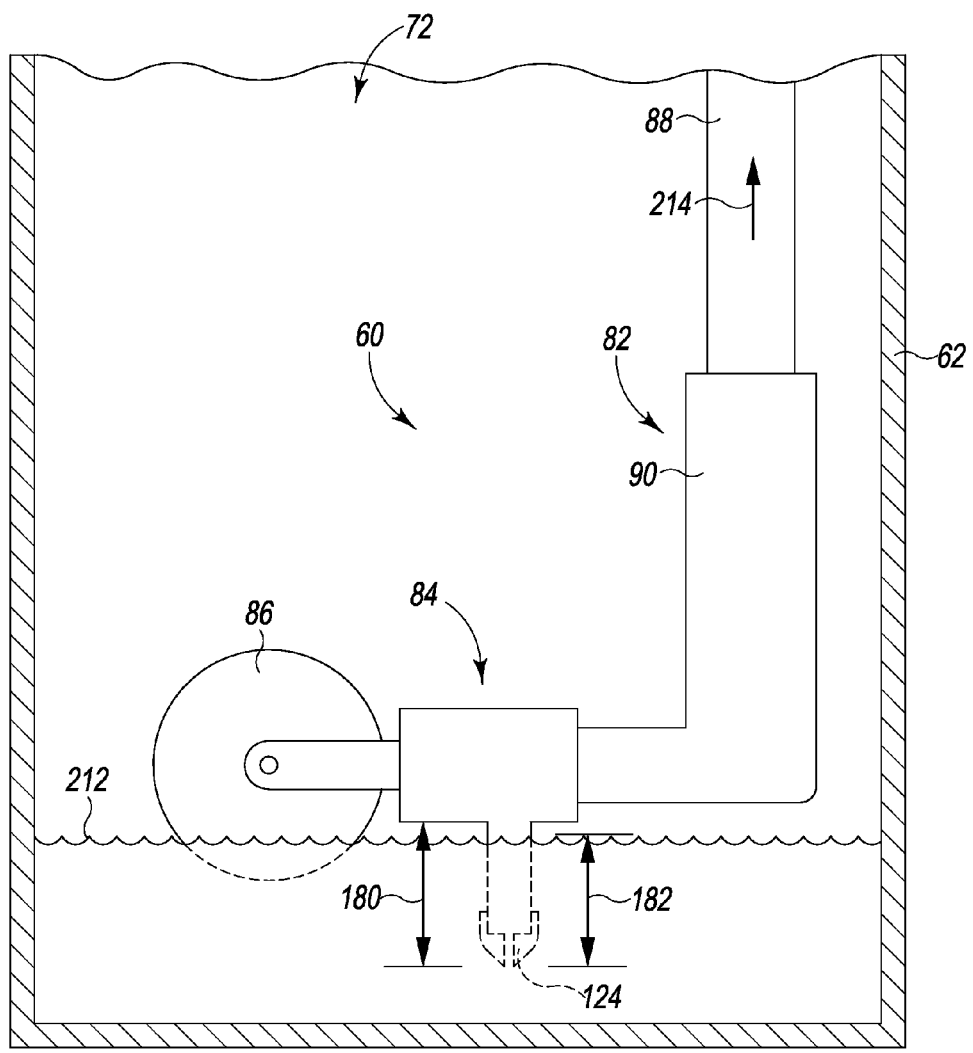
FIG. 4 is a cross-sectional side elevation view of the frothing device positioned inside the pitcher.
Figure 5:
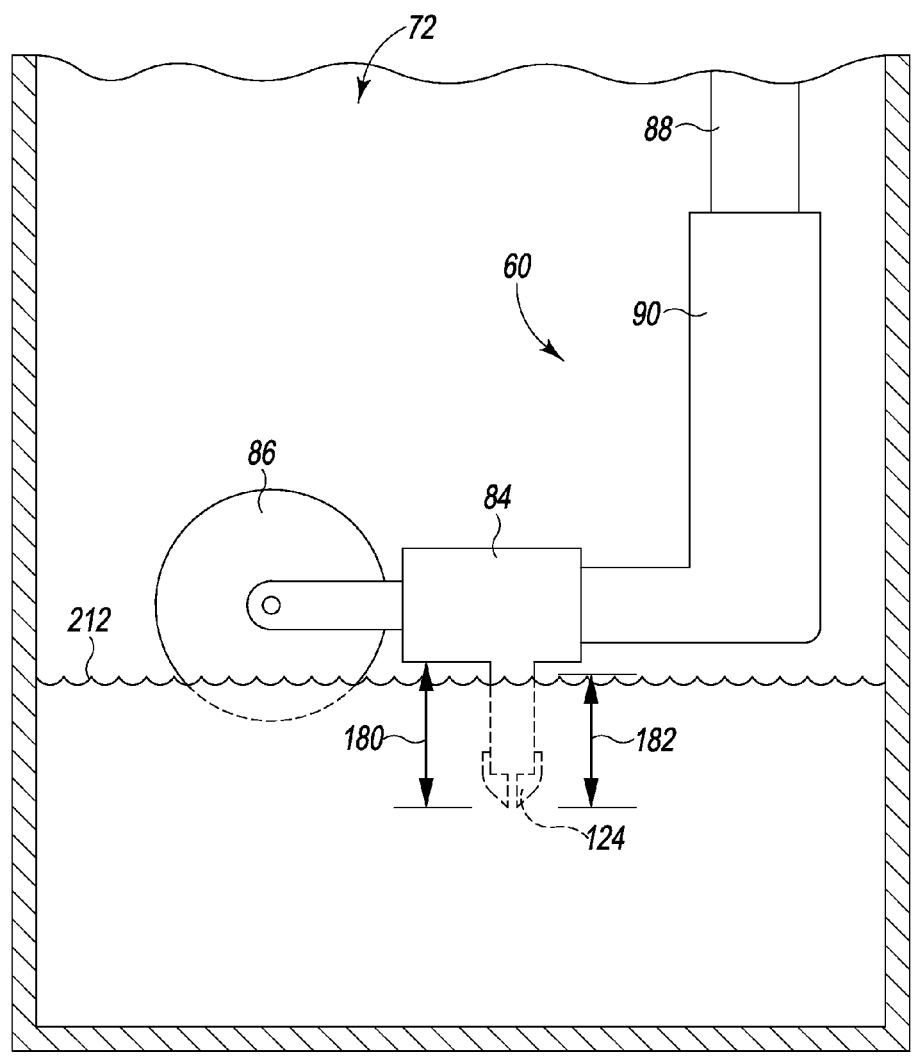
FIG. 5 is a view similar to FIG. 4 showing the frothing device positioned inside the pitcher.

When the user adds milk to the pitcher, the float device 86 maintains the frothing device 60 on the surface 212 of the milk such that the frothing device 60 rises with the level of the milk, as shown in FIG. 4. As the frothing device 60 rises with the milk, the pipe section 90 telescopes upward along the pipe section 88 as indicated by arrow 214. As shown in FIG. 5, the outlet 178 of the nozzle 124 is maintained at the desired depth 182 after a desired amount of milk has been added to the pitcher.

The user may operate the controls 24 to activate the boiler 208 and the other electronic components to generate steam. The user may use another of the controls 24 to operate the control valve 206 to connect the boiler 208 to the wand arm 48. Steam generated by the boiler 208 may advance through the control valve 206 and into the passageway 54 defined in the wand arm 48. The steam moves along the wand arm 48, into the hollow passageways 98, 100 of the telescopic pipe 82, and downward to the outlet 122. When the steam reaches a predetermined pressure, the bias exerted by the spring 152 is overcome, and the valve member 128 is urged from the blocking position to an open position. As a result, steam is permitted to enter the chamber 130 and advance down the passageway 176 of the arm 172. Steam exits the passageway 176 through the outlet 178 of the nozzle 124 at the desired depth 182 to froth the milk as desired.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An apparatus for making beverages, the apparatus comprising:
   a vessel sized to contain liquid,
   a boiler operable to produce steam,
   a wand fluidly coupled to the boiler,
   a housing configured to float on liquid contained in the vessel, and
   a control valve secured to the housing and fluidly coupled to an outlet of the wand, the control valve including (i) a nozzle configured to be positioned below the surface of the liquid, and (ii) a valve member movable between a first position in which steam is prevented from moving between the outlet of the wand and the nozzle and a second position in which steam is permitted to move between the outlet of the wand and the nozzle.

2. The apparatus of claim 1, wherein the nozzle is configured to be positioned at a predetermined depth below the surface of the liquid.

3. The apparatus of claim 1, wherein the valve member is pressure-operated.

4. The apparatus of claim 3, wherein the control valve further includes a biasing element configured to bias the valve member in the first position.

5. The apparatus of claim 1, further comprising a telescopic pipe having a first end coupled to the wand and a second end coupled to the control valve, wherein the telescopic pipe has a passageway defined therein connecting the outlet of the wand to the control valve.

6. The apparatus of claim 1, wherein the housing encapsulates a source of buoyancy.

7. The apparatus of claim 1, further comprising:
   a base,
   a filter chamber positioned above the base, the filter chamber including an outlet, and
   a valve including a valve member movable between (i) a first position in which steam is permitted to advance from the boiler to the wand and (ii) a second position in which fluid is permitted to advance from the boiler to the filter chamber.

8. An espresso machine comprising:
   a vessel sized to contain liquid,
   a steam generator, and
   a frothing device including (i) a control valve positioned in the vessel, (ii) a pipe having a first end fluidly coupled to the control valve and a second end fluidly coupled to the steam generator such that steam produced by the steam generator may be advanced to the control valve, (iii) a housing configured to float on the surface of the liquid contained in the vessel, and (iv) a nozzle configured to be positioned below the surface of the liquid,
   wherein the control valve includes a valve member movable between (i) a first position in which steam is permitted to advance through the nozzle into the liquid below the surface thereof and (ii) a second position in which steam is prevented from advancing through the nozzle.

9. The espresso machine of claim 8, wherein the frothing device includes a telescopic pipe.

10. The espresso machine of claim 8, wherein the nozzle has an outlet positioned a predetermined distance below the housing.

11. The espresso machine of claim 8, wherein the vessel is a pitcher.

12. The espresso machine of claim 8, further comprising:
    a base,
    a filter chamber positioned above the base, the filter chamber including an outlet, and
    a valve including a valve member movable between (i) a first position in which steam is permitted to advance from the steam generator to the nozzle and (ii) a second position in which fluid is permitted to advance from the steam generator to the filter chamber.

13. The espresso machine of claim 8, wherein the control valve further includes a biasing element configured to bias the valve member in the second position.

* * * * *